Nov. 4, 1952  P. R. GROSSMAN  2,616,678
FLUID HEATER CONTROL
Filed Jan. 8, 1949  2 SHEETS—SHEET 1

INVENTOR.
PAUL R. GROSSMAN
BY Raymond W. Jenkins
ATTORNEY

Patented Nov. 4, 1952

2,616,678

UNITED STATES PATENT OFFICE 2,616,678

FLUID HEATER CONTROL

Paul R. Grossman, Alliance, Ohio, assignor to The Babcock & Wilcox Company, Rockleigh, N. J., a corporation of New Jersey Application January 8, 1949, Serial No. 69,971

9 Claims. (Cl. 263—19)

My present invention relates in general to the operation and control of fluid heaters of the type in which the heat transfer medium consists of a fluent gas-pervious mass of refractory material which is first heated by the passage of a heating fluid in heat transfer relation therewith and is then cooled by contact with fluid to be heated; and more particularly to fluid heaters of the character illustrated and described in which the mass of heat transfer material in the form of pellets moves by gravity downwardly through a series of superposed heating and cooling chambers or zones connected by one or more throats of reduced flow area but structurally unobstructed, elevating the pellets to a point above the upper chamber, and again allowing them to move by gravity through the several chambers.

The heater may comprise a multiplicity of superposed refractory lined chambers, one or more of which may be adapted for the continuous heating of refractory pellets while one or more of the chambers is adapted for the heating of fluids by contact with the descending stream of hot pellets. The refractory pellets are arranged for gravity flow through the chambers and connected throat sections and then for external return from the lowermost chamber to the uppermost chamber. Certain arrangements of control apparatus and the operation of such a heater form particular features of my present invention.

In the present example, pellets are heated in an upper chamber by contact with a countercurrent stream of hot combustion gases after which they pass by gravity into a treating chamber where they treat the fluid which is to be processed. In some instances a third chamber is positioned below the treating chamber to effect a preheating of the air for combustion purposes in connection with the pellet heating chamber and to cool the pellets further. In the present embodiment two chambers are shown, connected by an unobstructed throat, and the invention relates particularly to the rate of movement of the pellets through the system. The invention is equally applicable to an arrangement having more than two chambers where any two of the chambers are connected by a throat section and where the general arrangement is one of gravity flow of the pellets through the various chambers and throats and with external return of the pellets from the lowermost outlet to an uppermost point in the assembly. By way of example however, I have chosen for the sake of simplicity to show a two chamber heat exchanger.

The general object of my invention is the provision of a method of and apparatus for operating and controlling fluid heating apparatus of the character disclosed, for continuously heating a fluid under pressure at high capacity to a uniform final temperature in a range whose upper temperature limit is dependent only upon the physical properties, such as the fusing temperature, of the refractory materials employed, with little or no contamination of the fluid being heated by the heating fluid employed and vice versa. The invention is carried out without subjecting any included metallic parts present to unsafe operating temperatures or requiring special corrosion and heat resistant alloys for metal operating temperatures over 900° F., and with a relatively high overall thermal efficiency.

I have chosen to describe my invention in connection with the heating to an elevated temperature of a fluid such as air or steam for process use. The fluid to be heated may of course be a liquid or a mixture of liquid and gas or vapor or other fluid.

The throat interconnecting the chambers is preferably of a cross section reduced in area as compared to the cross section of the chambers but unobstructed structurally so that there is a free gravity flow of heated pellets between the chambers. Provision is made for maintaining a balance in pressures between the two chambers, across the throat, to prevent passage of fluid from either chamber through the throat to the other.

A particular object of my present invention is to provide a control system for the apparatus described which is characterized by its ability to maintain the rate of movement of the heated pellets through the superposed chambers such as to result in optimum heating conditions of the fluid passing through the heating chamber in direct contact with the heated pellets.

A specific object is to utilize the temperature of the pellets as they leave the fluid heating chamber in a control of the rate of circulation of the pellets. Still another object is to control the rate of pellet circulation in accordance with a measure of the rate of supply of fluid to be heated as it passes into contact with the heated pellets.

Further objects will become evident through a study of the drawing and description and of the claims.

Figure 1:
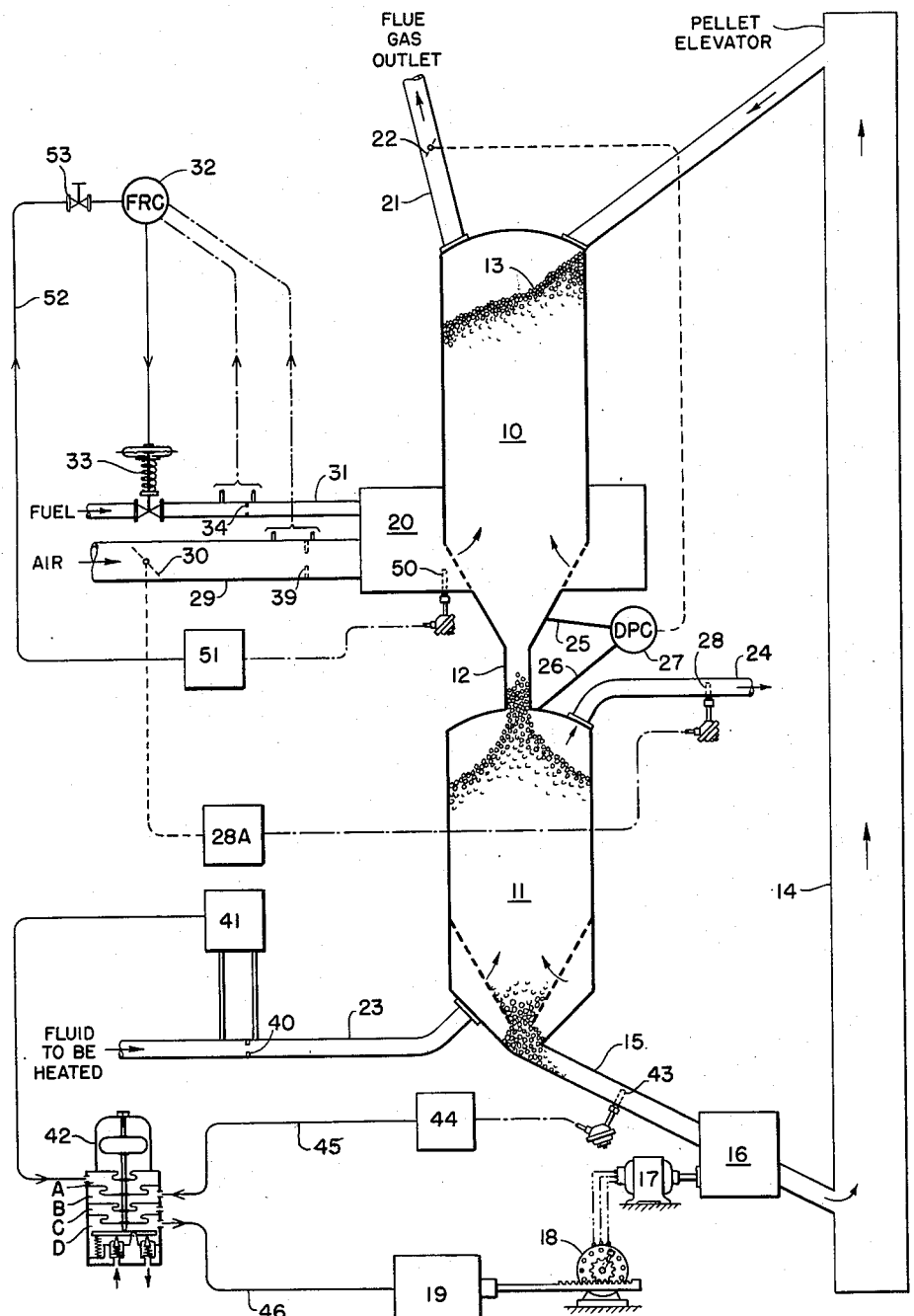
Fig. 1 is a diagrammatic showing, in elevation, of a two chamber heater to which one arrangement of my control system has been applied.

It appears unnecessary to complicate this showing by details of the construction of the heat exchanger or of the elevator system for returning the pellets from the exit of the lowermost chamber to the inlet to the uppermost chamber. Such constructions are known in the art and form no part of the present invention. Reference may be made to the patent to Bailey et al. 2,417,049. Thus the showing of the drawing is entirely diagrammatic insofar as the size, shape and general constructional arrangement of the principal apparatus is concerned. The apparatus which is concerned with the control of operation of such a heater unit and to which my invention is particularly directed, will be explained in detail.

While I have chosen, as an illustrative embodiment of my invention, to describe the operation in connection with the heating of air for process use it will be understood that the fluid to be heated may be a combustible hydrocarbon gas or vapor, or naphtha, sulphur or many varieties of fluid including steam to be superheated. Furthermore, the pellet heating chamber may contain a flowing fluid other than the gaseous products of combustion. Various arrangements of chambers and interconnecting throats may be used as well as commercial or special types of elevating systems external of the heat exchanger proper. For example, the elevating system external of the heat exchanger may constitute an air lift type or a bucket conveyor type or the like. To vary the speed of gravity movement of the pellets through the heat exchanger chambers it is necessary only to provide means for controlling the rate of discharge of the pellets from the outlet of the lowermost chamber to an entrance to the external elevating apparatus. Thus a control of rate of admission of pellets to the intake of the elevating system is independent of the type of elevating apparatus.

While I speak of the fluent gas pervious mass of solid heat contact material as being in the form of pellets which may be of refractory material and in the nature of ¼ to ½" diameter, it will be understood that the actual size and character of such material is not limiting to the invention and in fact the material may be of particle size or form such as is commonly utilized in the catalytic treatment of hydrocarbon and other fluids in present day practice.

Furthermore I do not intend that my invention be limited for use with a treating system depending entirely upon heat transfer for the fluid treatment. It is equally applicable to systems for the catalytic or other form of fluid treatment resulting from the passage of particle form material from one chamber to another, through an open unobstructed connecting throat section, and where it is essential that neither of the fluids be allowed to bleed through the throat from one chamber to another, and in a system where the rate of gravity movement of the heat exchange contact material be closely controlled.

The heating unit illustrated in the drawing is constructed and designed for the use of vapors or gaseous heating and heated fluids under pressure and as shown comprises as its main part an upper heating chamber 10 normally substantially filled with a downwardly moving fluent gas-pervious mass of refractory heat transfer material 13 in the form of pellets to be heated by high temperature gases passing therethrough. There is shown a connected subjacent heat absorbing or reaction chamber 11 arranged to receive and normally substantially completely filled with heated refractory material 13 from the upper chamber and in which the heated refractory material is utilized for heating a second fluid, in the present embodiment air for process use, to a predetermined temperature. The chambers 10 and 11 are interconnected by a throat section 12 of reduced cross section but structurally unobstructed by valves or the like to allow a free gravity flow of the heat transfer pellets 13 from the chamber 10 downwardly through the throat 12 into the treating chamber 11.

An elevating system is provided for receiving the relatively cooled refractory material from the lower chamber 11 and returning it to the upper chamber 10 and comprising a pellet elevator 14. The pellet elevator 14 may be of any commercial type providing a convenient means for returning the relatively cooled pellets from the bottom of chamber 11 to the top of chamber 10. A lowermost portion or outlet of the chamber 11 is connected by a conduit 15 to a lower inlet to the elevator 14. Interposed in the conduit 15 I provide a controllable feeder means 16 for variably allowing the pellets to feed from the chamber 11 into the elevator 14. By such means the rate of gravity flow of the material 13 downwardly through the chambers 10 and 11 may be regulated and thus the time of contact of the pellets with the different fluids may be controlled. This control forms a principal part of the present invention.

The controllable feeder mechanism 16 is driven by a variable speeed motor 17 having a control rheostat 18 positioned through the agency of a control device 19.

An annular combustion chamber 20 is supplied with fuel and air for supporting combustion and the rate of such supply is under control to provide the desired heating of the material 13 within the chamber 10 from one or more indexes of load upon the unit or of demand for heat. The general arrangement may be similar to that disclosed in the Bailey et al. Patent 2,417,049. The heated products of combustion from the combustion chamber 20 are admitted through a lower portion of the chamber 10 to pass upwardly through the interstices of the gas-pervious fluent mass 13 in intimate counterflow contact with the descending pellets whereby the pellets are heated to a high temperature and the gases leave through a flue gas outlet 21 at a relatively low temperature. Positioned in the outlet pipe 21 is a damper 22 for regulating the rate of discharge of the flue gas therethrough.

The pellets 13 move downwardly in a continuous column through the chamber 10 while being heated and through throat 12 into the subjacent chamber 11 and thence, after giving up the major portion of their heat, through the conduit 15 and feeder 16 to the elevator 14. The fluid to be heated in the chamber 11, such as air, steam, naphtha, or the like, is introduced through a conduit 23 to a lower portion of the chamber 11 under a predetermined pressure and passes upwardly through the interstices between the descending pellets 13 in the chamber 11 where it is heated in counterflow heat transfer and then passes out at a desired temperature through an outlet conduit 24.

The relative pressures in the chambers 10 and 11 as well as the flow between the chambers, or lack of flow, is controlled by provision disclosed in a copending application of Ervin G. Bailey and Ralph M. Hardgrove Serial No. 502,580, filed September 16, 1943, now Patent No. 2,447,306. Connected to opposite ends of the throat section 12 are pressure pipes 25, 26 joining a differential pressure controller 27 which is arranged to position the flow regulating damper 22. In general the differential pressure controller 27 performs the function of so regulating the pressure in the chamber 10 as to maintain a balance of pressure across the throat 12 and thereby substantially prevent any interflow of fluid from one of the chambers 10 or 11 to the other. Such provision minimizes the dilution of the fluid in one chamber by that from another chamber. Furthermore, it obviates the necessity of any gate or valve structure in the throat 12, permitting free gravity egress of pellets from the upper chamber to the lower chamber without substantial fluid passage from one chamber to another through the interstices of the gas pervious fluent mass of refractory pellets passing by gravity downwardly through the throat.

If the pressure at the lower end of chamber 10 (to which the pipe 25 is connected) is greater than that at the upper end of chamber 11 (to which the pipe 26 is connected) there will be a tendency for the gaseous products of combustion within the chamber 10 to flow downwardly through the neck 12 and dilute the fluid in the chamber 11. Such a pressure differential existing between the pipes 25, 26 will result in the differential pressure controller 27 positioning the damper 22 in an opening direction so as to relieve the excess pressure within the chamber 10 and reduce that pressure which is effective within the pipe 25 relative to that which is effective within the pipe 26.

Conversely, if the pressure at the top of the chamber 11 is in excess over that at the bottom of chamber 10, the action of the differential pressure controller 27 will be such as to tend to close off the damper 22 and allow pressure within the chamber 10 to build up until the pressure at location 25 is equal to that at location 26 and the pressure condition across the neck 12 in balance. Thus it will be observed that the action of the pressure controller 27 in positioning the damper 22 is based entirely upon an interrelation of pressures between the chambers 10 and 11 and not upon the actual static pressures in the chambers.

The final desideratum of the system is the heating of the fluid passing through the chamber 11 to a desired temperature as it leaves through the conduit 24. For sensing such temperature I provide a temperature sensitive element 28 located in the conduit 24 at the exit from the chamber 11 and having a temperature responsive controller 28A. The basic factor in the heating of the fluid is the temperature of the pellets passing through the chamber 11 which are contacted by the fluid in counterflow passage from conduit 23 to conduit 24. Obviously the temperature to which the pellets are heated in chamber 10 will depend upon the combustion gases supplied to the chamber 10 from the combustion zone 20 and in turn the heat so supplied may be controlled by regulating the supply of fuel and/or air for combustion. Inasmuch as the heating value, pressure, and other variables in the supply of fuel may vary and therefore the heat availability may vary per unit of fuel I choose to primarily control the rate of supply of combustion air admitted to the combustion chamber 20 through the conduit 29 by positioning therein a damper 30 under the control of the temperature sensitive element 28. Theoretically the amount of combustion air required for the liberation of 10,000 B. t. u. with either an oil or gas fuel will remain substantially unvarying regardless of the characteristics of the actual fuel admitted to the combustion chamber 20 through a conduit 31.

For proportioning the rate of supply of fuel through the conduit 31 to the rate of supply of combustion air through the conduit 29 I provide a flow ratio controller 32 adapted to position a control valve 33 located in the conduit 31. Primarily the suply of air is controlled by the positioning of the damper 30 under control of the temperature responsive element 28. Having established the desired rate of supply of combustion air then the ratio controller 32 causes a positioning of the fuel valve 33 to maintain desired proportionality between the supply rate of fuel and the supply of air for combustion.

Located in the conduit 31 is an orifice 34 providing means for measuring the rate of flow of fuel. Similarly located in the conduit 29 is an orifice 39 for measuring the rate of supply of air. The flow ratio controller 32 is sensitive to pressure differentials existing across the orifices 34, 39 and may be manually adjusted to maintain any desired ratio between the rates of flow.

Through the agency of the devices 28, 28A, 30 and the flow ratio controller 32 heated products of combustion are supplied to the chamber 10 at the rate to satisfy the heating of the fluid passing through the chamber 11 in contact with the heated pellets therein. Furthermore the combustion of fuel and air in the combustion chamber 20 takes place under conditions of maximum efficiency and temperature to provide the desired heating without damage to the combustion chamber or to cause fusion of the pellets being heated. The arrangement is in certain aspects illustrated described and claimed in the copending application of Paul R. Grossman and Jack F. Shannon Serial No. 31,258, filed June 5, 1948, now Patent No. 2,577,655.

In connection with the fuel-air ratio control of the elements of combustion supplied to the combustion chamber 20 I provide an emergency or safety feature on the fuel control whereby, in the event that furnace lining temperature reaches a predetermined high value, the fuel supply will be reduced. This is purely a limiting control for protection of the lining of the chamber 10.

At 50 I show a temperature sensitive element arranged to actuate a controller 51 for establishing a pneumatic loading pressure in a pipe 52 directly representative of temperature at a desired location in the lining of the furnace 20. Such loading pressure is effective through the hand adjusted throttling valve 53 upon the mechanism of the flow ratio controller 32 to bias the latter for limiting the increase in rate of fuel supply when a predetermined furnace temperature at location 50 is reached or exceeded. The arrangement is such that irrespective of the rate of fuel supply existing at the moment, if the excessive furnace temperature is reached, then no further increase may be made in the rate of fuel supply until such temperature falls below a predetermined value. The particular features and advantages of such an arrangement are disclosed and claimed in the previously mentioned copending application of Grossman et al. Serial No. 31,258.

For positioning the control device 19 I show an arrangement sensitive to rate of flow of the fluid to be heated passing through the conduit 23 and/or the temperature of the pellets leaving the chamber 11 through the conduit 15. Located in the conduit 23 is an orifice 40 for creating a pressure differential bearing a known relation to rate of flow of the fluid therethrough. A rate of flow meter 41 is connected across the orifice 40 and continually provides a pneumatic loading pressure representative of rate of fluid flow and applied to the A chamber of an averaging relay 42.

At 43 I show a temperature sensitive element located in the conduit 15 to be sensitive to temperature of the pellets passing therethrough from the bottom of the chamber 11 to the feeder 16. A temperature controller 44 is provided in connection with the element 43 and continually establishes a pneumatic loading pressure in the pipe 45 representative of pellet temperature. Such temperature effect is applied to the B chamber of the averaging relay 42. The D chamber of relay 42 provides a control pressure in the pipe 46 effective upon the control device 19 to cause the latter to position the rheostat 18 responsive to rate of fluid flow through the conduit 23 and/or temperature of the pellets passing through the conduit 15.

If it is impractical to insert the bulb 43 in conduit 15 due to abrasion possibilities from the pellets it may be located in the feeder 16 where the variations in air temperature will be representative of variations in pellet temperature.

Figure 2:
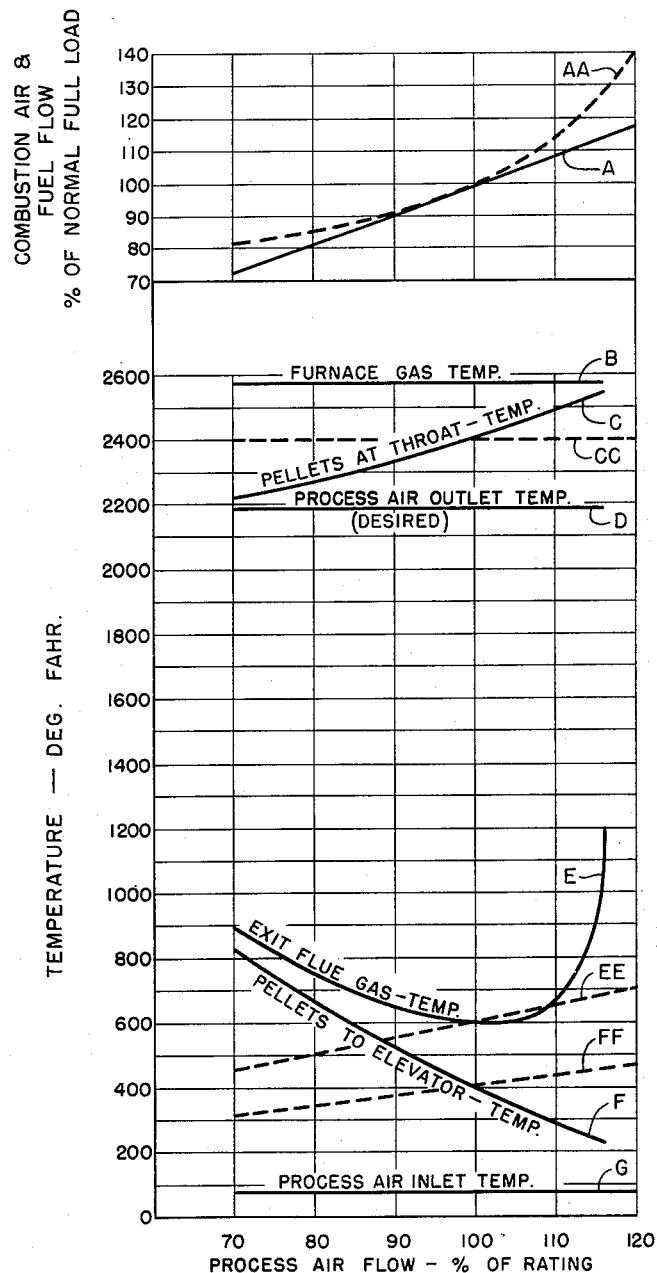
Fig. 2 is a graph of operating conditions in the heater of Fig. 1.

In Fig. 2 I illustrate by graphs certain operating conditions of an actual pellet heater of the type disclosed and particularly operating temperatures as they are affected by rate of pellet circulation.

In the operation of pellet heaters of the type described, the unit is ordinarilly installed for a substantially uniform flow of heated process fluid through the chamber 11, with the fluid delivered at an essentially uniform temperature. Under these conditions the temperature and volume of the heating gases generated in the furnace 20 are coordinated with pellet flow rate to heat the process fluid to the proper temperature under the required process fluid flow conditions, at a maximum unit thermal efficiency. Some variations in the heat output can be expected resulting from fluctuations in rate of flow, temperature and/or pressure of the supply of fluid to be heated, or by intentionally increasing or decreasing the rate at which the process fluid is used from the conduit 24. Such variations will change the required heat output of the heater, but in the majority of heater installations will necessitate the maintenance of a substantially uniform process fluid temperature. In the usual course of heater operations, these variations in heat output are minor and of the order of 5 or 10% above or below the normal or intended heat output of the heater. Such variations in heat output are controllable and can ordinarily be handled without unreasonable losses in heater thermal efficiencies by the three controls hereinbefore first described, namely:

1. Throat differential pressure control maintaining a balance of pressures between the chambers.
2. Outlet fluid temperature control establishing the rate of flow of combustion air.
3. Fuel-air ratio control combined with furnace temperature measurement conjointly regulating the fuel rate to maintain combustion efficiency and constant furnace temperature. These controls are also reasonably adequate to regulate the operation of the heater during a minor change in the rate of pellet movement through the heater which may occur due to change in feeder calibration due to wear, or the like.

Although the three normally used controls are sufficient to satisfactorily regulate the operation of the heater in a great many installations, a control of rate of pellet circulation is necessary for the best operation of the heater in many other installations. The latter condition arises when the range of heat output variation increases beyond the ordinary limits hereinbefore indicated, and more particularly when the temperature differential between the heating gases and the heated fluid is low. Such a low temperature differential is encountered when the maximum furnace gas temperature is limited by the refractory materials in the furnace 20 or chamber 10, or by the composition of the pellets 13, and the desired heated process fluid delivery temperature is within a few hundred degrees of the heating gas temperature.

In Fig. 2 I illustrate by graphs the operating conditions of an actual fluid heater, particularly showing the operating temperatures as they are affected by changes in process fluid flow and changes in pellet flow rate. Curves A, B, C, E, F and G illustrate operating conditions of the fluid heater during a change in process air flow, with a substantially uniform pellet flow rate while curve D shows desired outlet temperature at element 28. Curves AA, CC, EE and FF illustrate operating conditions during a change in process air flow with a coordinated change in pellet flow rate as obtained with the controls of the present invention.

If the heater is operating on the usual automatic control (numbered 1, 2, 3 above), and the rating increases by way of an increase in process fluid usage and the pellet rate is unchanged, the temperature of the process fluid will be lowered, as will the pellet discharge temperature to the elevator. Temperature sensitive element 28 will call for an increase in combustion air flow (curve A), with a proportional increase of fuel flow as regulated by the controller 32. The furnace temperature (curve B) will remain substantially constant even though the total heat input and mass flow of heating gas to the chamber 10 will be increased. The effects of this condition are shown in Fig. 2, wherein the pellet temperature at the throat (curve C) will increase and, with increasing heat input to the chamber 10, approach the furnace gas temperature. Simultaneously with the increase in pellet temperature, the flue gas temperature curve E increases rapidly, indicating an inability of the pellets to absorb any appreciable amount of the increased heat input, at the original pellet flow rate. With the slight increase in pellet temperature, as measured at the throat, the total heat in the pellets delivered to the chamber 11 will, of course, also be increased, but such an increase is inadequate to meet the heat requirements of the process air, and the element 28 cannot be satisfied for an increase in process fluid flow rate of more than 5-10 per cent of normal without a reduction in the heat efficiency of the unit. Under these conditions the temperature of the pellets discharged to the elevator (curve F) will decrease, as shown. When the heater is operating with the usual automatic control (numbered 1, 2, 3 above) with the addition of pellet flow rate control, the unit is capable of operation over a wider range of process fluid flow rates at a substantially uniform process fluid outlet temperature and a relatively high thermal efficiency for the heater. This is indicated by the curves AA, CC, EE and FF. An increase in process air flow not only causes an increase in combustion air flow, but also increases the rate of pellet flow through the heater. The increased pellet flow permits a greater proportion of the added heat delivered to the chamber 10 by the increased heat content of the furnace gases to be absorbed by the pellets. This will not only tend to restrict the increase in flue gas temperature as shown by curve EE, but will also tend to restrict the temperature reduction in the pellets delivered to the elevator as shown in curve FF. As a result, the heater will be able to maintain the desired process air outlet temperature through an extended range of process air flow rates.

In the illustrated example of the operation of the heater shown by the curves of Fig. 2, the safe furnace gas operating temperature is approximately 2580° F. (curve B), while the desired process air outlet temperature is approximately 2180° F. (curve D). This is a reasonably wide temperature differential. However, with a substantially constant pellet flow rate, an increase of process air flow rate above about 10% of normal will cause the exit flue gas temperature to rise rapidly (curve E) with the increase in combustion air flow (curve A) and the unit will be unable to satisfy the heat requirements of the process air. With the addition of the pellet flow rate control of the present invention, the capacity range of operation has been increased while maintaining a reasonable thermal efficiency, as shown by the curves AA, CC, EE and FF. In some heater installations, the temperature differential between heating gas and process fluid may be of the order of 150° F., with the furnace gas heating temperature as high as shown, or higher. With such a temperature differential, the need for a pellet rate control is highly necessary for satisfactory operation of the heater.

Specifically, referring to Fig. 1, when the demand upon the process air increases, this is immediately felt upon the flow controller 41 to proportionally increase the loading pressure effective in the A chamber of relay 42 thereby increasing the loading pressure within the pipe 46 and causing the control device 19 to effect a speed up of the feeder 16 and thus an increase in rate of pellet circulation. It will be observed from Fig. 2 that, as the pellet rate increases, the temperature of the pellets passing through the conduit 15 to the elevator 14 will tend to change and as a checkback from this variable the temperature responsive element 43 is effective, through the control 44, in applying an increasing loading pressure upon the B chamber and thus tending to cut back on the increased speed of pellet travel.

While I have illustrated and described a preferred embodiment of my invention wherein the rate of pellet circulation is regulable responsive to rate of supply of fluid to be heated, or demand, and to actual temperature of the pellets leaving the heating chamber, it is to be understood that this is illustrative only and not to be considered as limiting.

What I claim as new and desire to secure by Letters Patent of the United States, is:

1. The method of operating a fluid heater of the type having two chambers connected by a throat with heat transfer material in each of the chambers and in the throat and having provision for substantially continually moving such material from the first chamber through the throat to and through the second chamber and exteriorly from the second chamber back to the first chamber, including, maintaining a supply of heating medium to the first chamber to heat material as it passes therethrough, passing a fluid to be heated through the second chamber in direct contact with the heated material passing therethrough, and continually regulating the speed of movement of all the heat transfer material through the system responsive to both the temperature of the heat transfer material after it has left the second chamber and to the rate of flow of fluid to be heated as an index of heat demand upon the second chamber.

2. The method of claim 1 including the step of regulating the supply of heating medium responsive to a temperature condition of the heated fluid after it has contacted the heat transfer material in the second chamber.

3. The combination with a fluid heater having an upper chamber enclosing a fluent mass of refractory pellets, a lower chamber enclosing a fluent mass of refractory pellets, a passage forming a throat of reduced cross-section between said upper and lower chambers and enclosing a column of refractory pellets connecting said masses, means external of said chambers and throat arranged to return pellets to an inlet to the upper chamber, a feeder at the exit of the lower chamber feeding pellets at a regulable rate from the lower chamber to the returning means, a heating supply for the pellets in the upper chamber, a supply of fluid to be heated passing through the lower chamber in direct contact with the heated pellets therein, means sensitive to the temperature of the pellets after they have left the lower chamber, means measuring the rate of flow of fluid to be heated to the lower chamber, and a device jointly responsive to the sensitive means and the measuring means adapted to regulate the feeder speed.

4. The combination with a fluid heater having an upper chamber enclosing a fluent mass of refractory pellets, a lower chamber enclosing a fluent mass of refractory pellets, a passage forming a throat of reduced cross-section between said upper and lower chambers and enclosing a column of refractory pellets connecting said masses, means external of said chambers and throat arranged to return pellets to an inlet to the upper chamber, a feeder at the exit of the lower chamber feeding pellets at a regulable rate from the lower chamber to the returning means, a heating supply for the pellets in the upper chamber, a supply of fluid to be heated passing through the lower chamber in direct contact with the heated pellets therein, means sensitive to the temperature of the pellets after they have left the lower chamber and at a point adjacent the feeder, means measuring the rate of flow to the lower chamber of fluid to be heated, and regulating means for the feeder conjointly responsive to said sensitive means and to said measuring means.

5. The combination with a fluid heater having superposed chambers connected by a structurally unobstructed throat of reduced cross-section, a mass of fluent gas-pervious heat transfer material in the form of pellets confined by the chambers and throat, said mass being adapted to move progressively downwardly by gravity through the chambers and throat, and means returning the pellets from an exit from the lower chamber to an inlet to the upper chamber, of a heating medium supply for the material in the upper chamber, a supply of fluid to be heated passed through the lower chamber in direct contact with the heated material therein, means continually sensitive to the rate of flow of fluid to be heated as an index of demand for heat upon the lower chamber, pellet flow control means arranged to regulate the rate of gravity movement of the pellets through the lower chamber, means continually sensitive to temperature of the pellets adjacent said flow control means, and a device jointly responsive to the fluid flow sensitive means and the temperature sensitive means adapted to regulate the pellet flow control means.

6. The combination of claim 5 including means controlling the heating medium supply sensitive to temperature of said supply before it enters the upper chamber.

7. The combination of claim 5 including means acting upon the heating medium supply sensitive to temperature of the fluid after it has been heated in the lower chamber.

8. The method of operating a fluid heater of the type having an upper and lower chamber connected by a throat with particle form heat transfer material in each of the chambers and in the throat and having provision for substantially continually moving such material from the upper chamber through the throat to and through the lower chamber and exteriorly from the lower chamber back to the upper chamber, including, maintaining a supply of heating medium to the upper chamber to heat the transfer material as it passes therethrough, passing a fluid to be heated through the lower chamber in direct contact to the heated material passing therethrough, and continuously regulating the speed of movement of the heat transfer material through the system responsive to both the temperature of the heat transfer material after it has left the lower chamber and the rate of flow of the fluid to be heated in the lower chamber.

9. The method of operating a fluid heater of the type having two chambers connected by a throat with heat transfer material in each of the chambers and in the throat and having provision for substantially continually moving such material from the first chamber through the throat to and through the second chamber and exteriorly from the second chamber back to the first chamber, including, maintaining a supply of heating medium to the first chamber to heat material as it passes therethrough, regulating the supply of heating medium responsive to a temperature condition of the heating medium prior to its contact with the heat transfer material in the first chamber, passing a fluid to be heated through the second chamber in direct contact with the heated material passing therethrough, and regulating the speed of movement of the heat transfer material through the system responsive to the temperature of the heat transfer material after it has left the second chamber and to an index of heat demand upon the second chamber.

PAUL R. GROSSMAN.

REFERENCES CITED

The following references are of record in the file of this patent:

UNITED STATES PATENTS

| Number | Name | Date |
| --- | --- | --- |
| 1,794,531 | Newell | Mar. 3, 1931 |
| 2,206,930 | Webster | July 9, 1940 |
| 2,417,049 | Bailey et al. | Mar. 11, 1947 |
| 2,432,873 | Ferro et al. | Dec. 16, 1947 |
| 2,447,306 | Bailey et al. | Aug. 17, 1948 |